United States Patent
Cha et al.

(10) Patent No.: US 10,037,477 B2
(45) Date of Patent: Jul. 31, 2018

(54) COMBINED INTENSITY AND COHERENT CHANGE DETECTION IN IMAGES

(71) Applicant: Massachusetts Institute of Technology, Cambridge, MA (US)

(72) Inventors: Miriam Cha, Cambridge, MA (US); Rhonda D. Phillips, Somerville, MA (US); Patrick J. Wolfe, London (GB); Christ D. Richmond, Dorchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 66 days.

(21) Appl. No.: 15/187,035

(22) Filed: Jun. 20, 2016

(65) Prior Publication Data

US 2017/0061217 A1 Mar. 2, 2017

Related U.S. Application Data

(60) Provisional application No. 62/212,225, filed on Aug. 31, 2015.

(51) Int. Cl.
*G06K 9/00* (2006.01)
*G06K 9/62* (2006.01)
*H04B 7/185* (2006.01)

(52) U.S. Cl.
CPC ....... *G06K 9/6212* (2013.01); *G06K 9/00664* (2013.01); *G06K 9/6277* (2013.01); *G06K 2209/051* (2013.01); *G06K 2209/21* (2013.01)

(58) Field of Classification Search
USPC ....... 382/100, 103, 106–107, 128, 155, 162, 382/168, 173, 181, 199, 209, 220, 224,
(Continued)

(56) References Cited

U.S. PATENT DOCUMENTS 5,606,376 A 2/1997 Shinohara
5,806,521 A * 9/1998 Morimoto ............ A61B 8/0858
600/447
(Continued)

FOREIGN PATENT DOCUMENTS

WO WO 2012/038705 A1 3/2012
WO WO 2016/005738 A1 1/2016

OTHER PUBLICATIONS

Cha et al. "Combined Intensity and Coherent Change Detection for Synthetic Aperture Radar"; MIT Lincoln Laboratory and University College London; 4 pages.
(Continued)

*Primary Examiner* — Seyed Azarian
(74) *Attorney, Agent, or Firm* — Daly, Crowley, Mofford & Durkee, LLP

(57) ABSTRACT

Described embodiments detect changes in a scene over time using first and second images of the scene. A non-coherent intensity change detector detects large-scale changes between the first image and the second image and generates a large-scale change value for pairs of corresponding pixel locations in the first and second images. If the large-scale change value for a given pair of pixel locations reaches a threshold, a coherent change detector is used to detect small-scale changes between the first and second images. A small-scale change value is generated for the given pairs of pixel locations in the images. A composite change value is generated by combining the large-scale change value and the small-scale change value for each pixel pair. The change thresholds are used to determine whether a change in the scene has occurred over the time period.

30 Claims, 6 Drawing Sheets

(58) Field of Classification Search
USPC ....... 382/232, 254, 274, 276, 286–294, 305, 382/312, 316, 218, 318; 342/352; 345/419; 600/447
See application file for complete search history.

(56) References Cited

U.S. PATENT DOCUMENTS

| | | | |
|---|---|---|---|
| 6,163,620 | A | 12/2000 | Hojnacki et al. |
| 6,307,951 | B1 | 10/2001 | Tanigawa et al. |
| 6,453,058 | B1 | 9/2002 | Murthy et al. |
| 6,622,118 | B1 | 9/2003 | Crooks et al. |
| 6,650,273 | B1 | 11/2003 | Obenshain |
| 7,898,457 | B2 | 3/2011 | Jahangir |
| 8,005,301 | B2 | 8/2011 | Plant |
| 8,138,960 | B2 | 3/2012 | Nonaka et al. |
| 8,620,093 | B2 * | 12/2013 | Nguyen ............... G06K 9/6244 382/218 |
| 8,724,918 | B2 | 5/2014 | Abraham |
| 8,786,485 | B2 | 7/2014 | Atkins et al. |
| 8,805,005 | B2 | 8/2014 | Jahangir et al. |
| 9,396,552 | B1 | 7/2016 | Kloer |
| 2009/0256741 | A1 * | 10/2009 | Shibayama ............. G01S 13/90 342/352 |
| 2010/0020066 | A1 * | 1/2010 | Dammann ............... G06T 19/00 345/419 |
| 2011/0222781 | A1 * | 9/2011 | Nguyen ............... G06K 9/6244 382/218 |
| 2011/0299733 | A1 * | 12/2011 | Jahangir ............. G01S 13/9023 382/103 |

OTHER PUBLICATIONS

Liao et al. "Urban Change Detection Based on Coherence and Intensity Characteristics of SAR Imagery", Photogrammetric Engineering & Remote Sensing, Aug. 2008; 999-1006 (8 pages).

Bouaraba et al. "Change Detection and Classification Using High Resolution SAR Interferometry", Chapter 5, INTECH, 2014; pp. 149-164; 16 pages.

Cha et al. "Test Statistics for Synthetic Aperture Radar Coherent Change Detection"; IEEE Workshop on Statistical Signal Processing (SSP), 2012; 1 page.

Preiss et al. "Detecting Scene Changes Using Synthetic Aperture Radar Interferometry", IEEE Transcriptions on Geoscience and Remote Sensing, vol. 44, No. 8, Aug. 2006, pp. 2041-2054(14 pages).

Stojanovic et al. "Change Detection Experiments Using Gotcha Public Release SAR Data", Scientific Systems Company, Inc., 2013, 10 pages.

He et al. "Urban change detection using Coherence and Intensity Characteristics of Multi-temporal SAR Imagery", Institute of Satellite Navigation & Spatial Information System in China, IEEE 2009; 4 pages.

PCT Search Report and Written Opinion of the ISA dated Mar. 23, 2017 for PCT/US 16/39937; 15 Pages.

PCT International Preliminary Report on Patentability dated Mar. 15, 2018 for International Application No. PCT/US2016/039937; 8 pages.

* cited by examiner

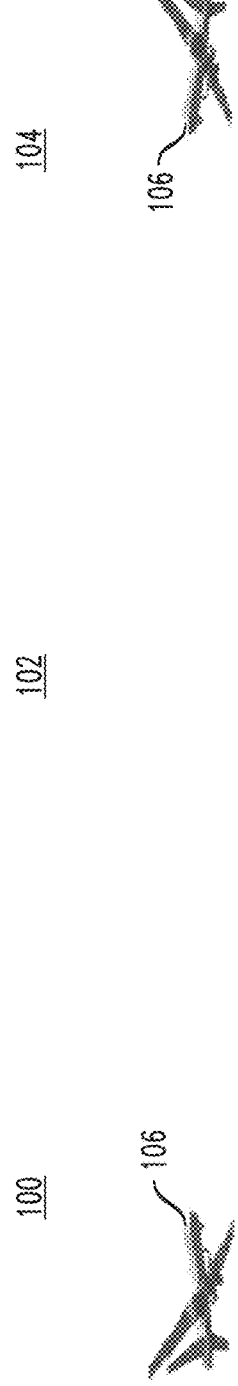
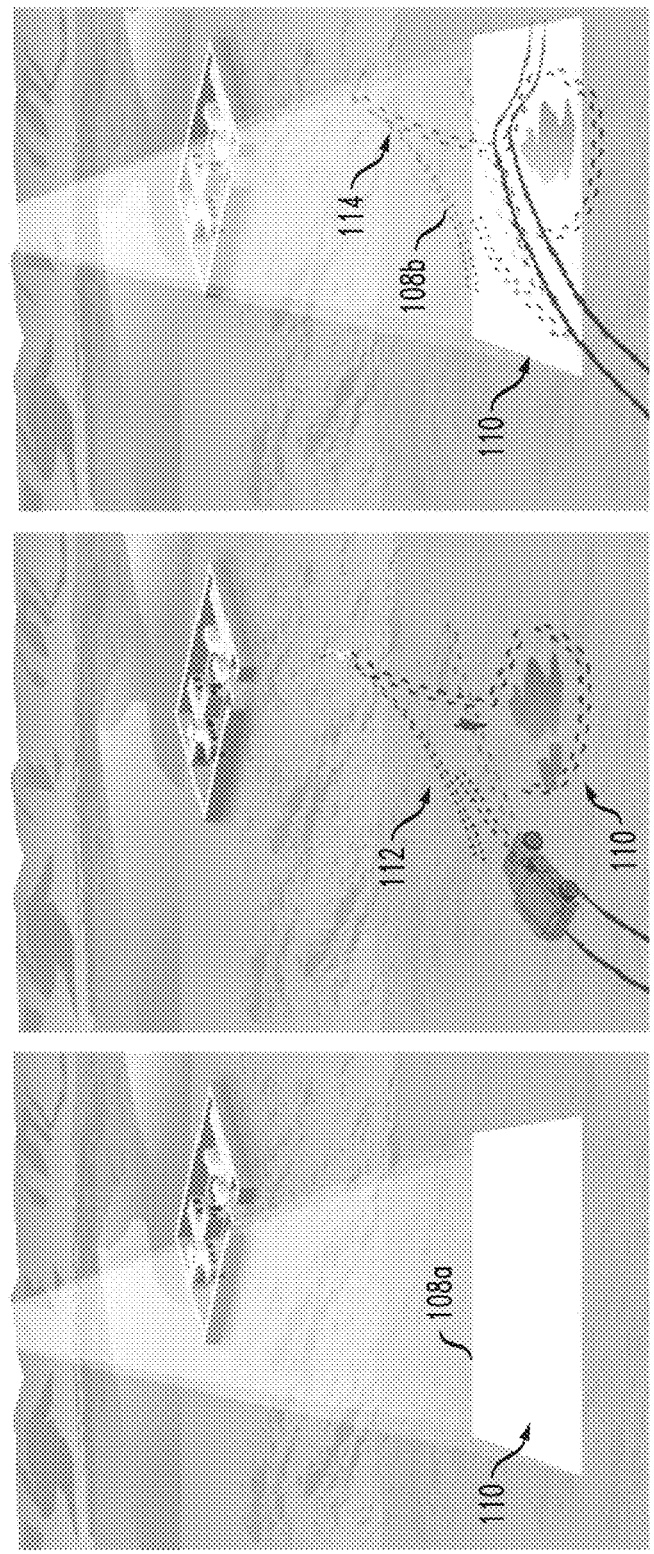
FIG. 1

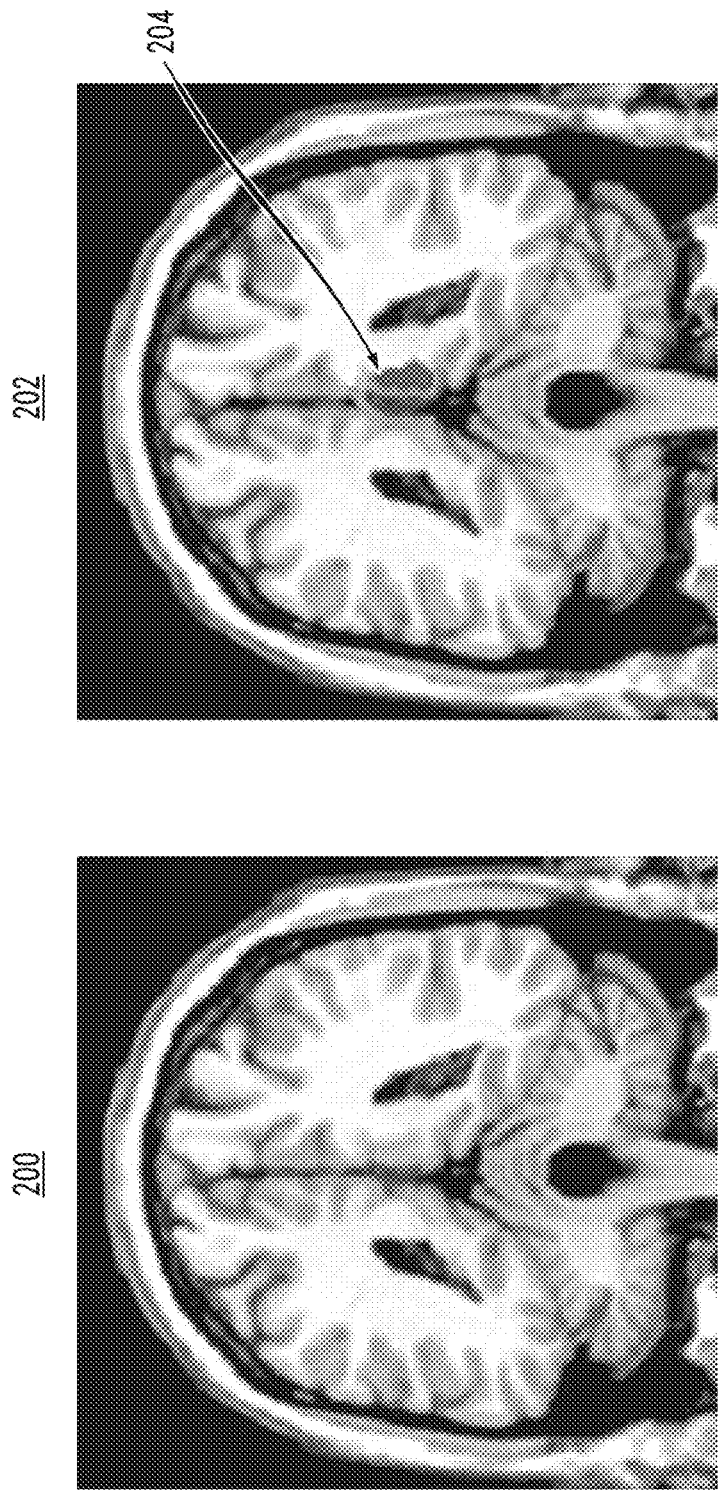

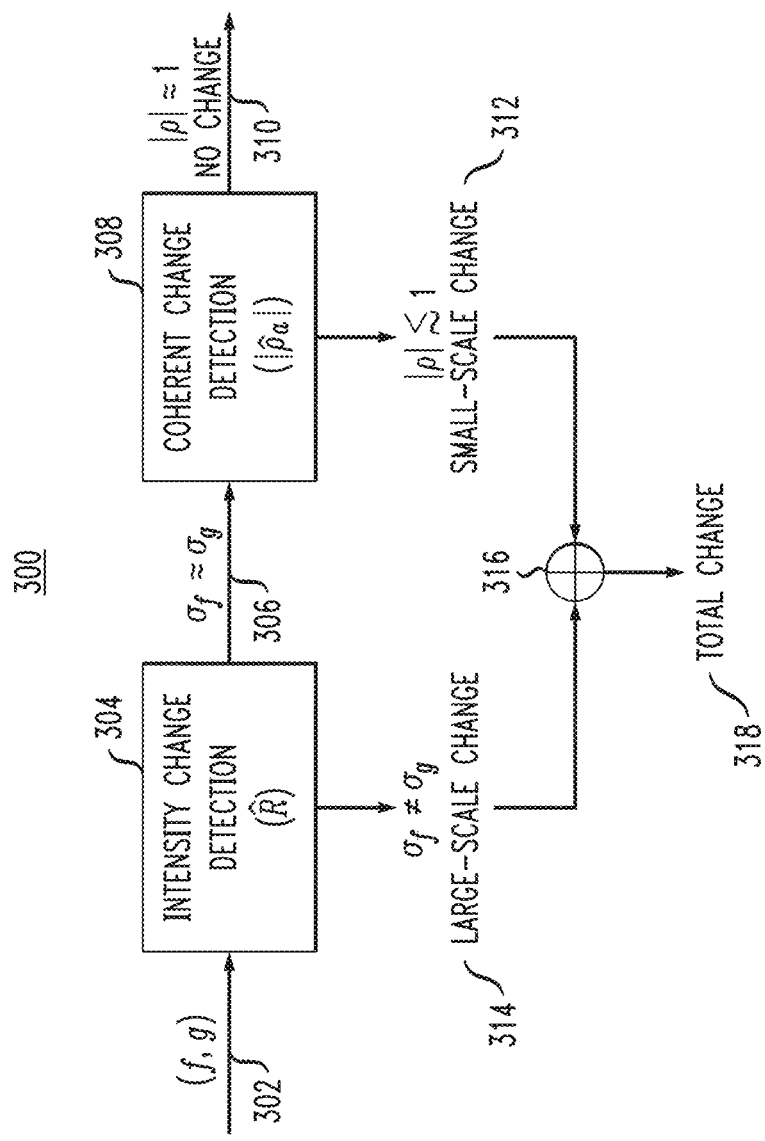

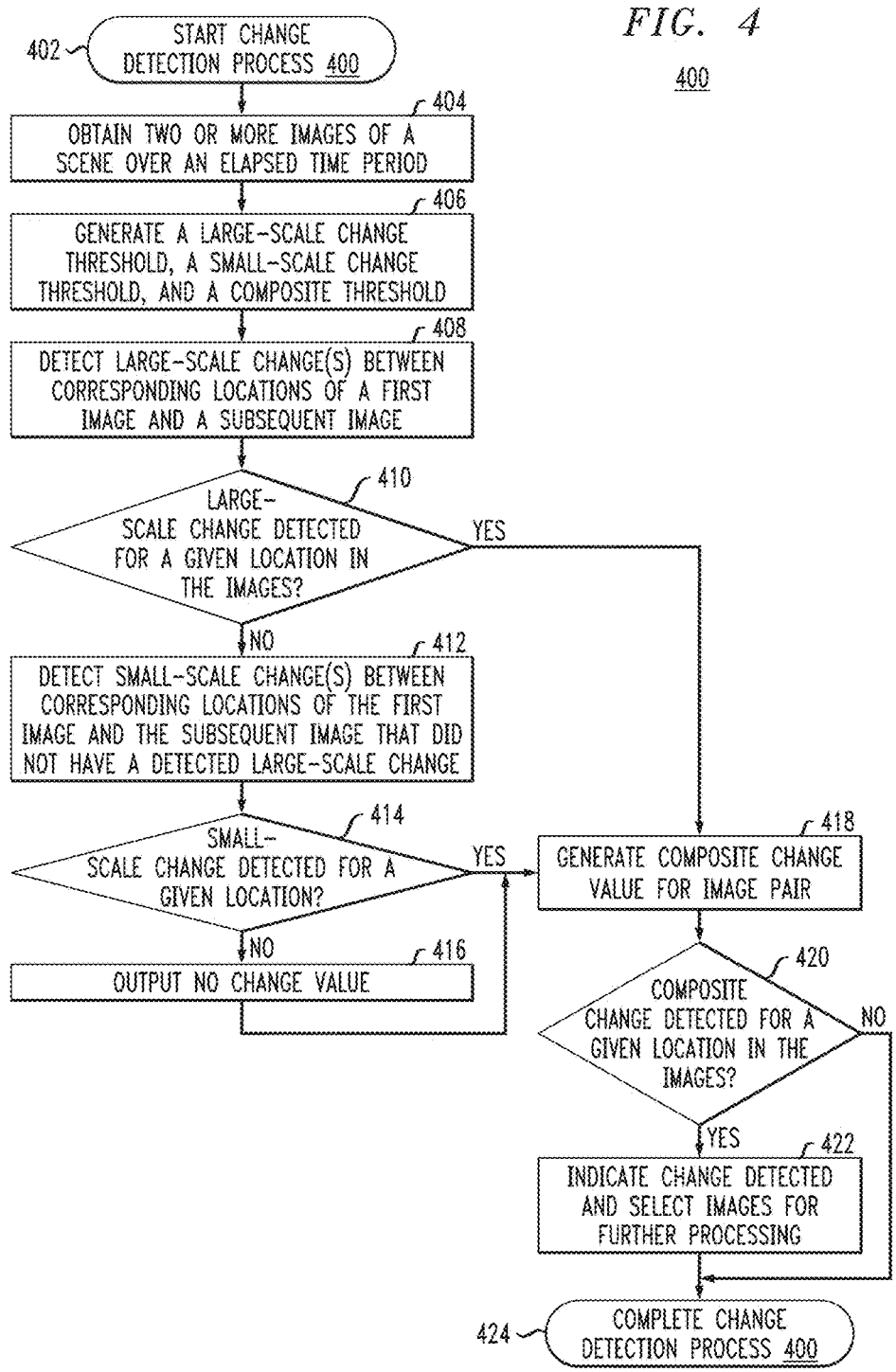

500

502

504

COMBINED INTENSITY AND COHERENT CHANGE DETECTION IN IMAGES

CROSS-REFERENCE TO RELATED APPLICATIONS

This application claims the benefit under 35 U.S.C. § 119(e) of the filing date of U.S. provisional application No. 62/212,225, filed on Aug. 31, 2015, the teachings of which are incorporated herein by reference in their entirety.

STATEMENT REGARDING FEDERALLY SPONSORED RESEARCH OR DEVELOPMENT

This invention was made with Government support under Contract No. FA8721-05-C-0002 awarded by the United States Air Force. The Government has certain rights in the invention.

BACKGROUND

Synthetic Aperture Radar (SAR) is frequently employed in remote sensing due to its ability to form high-resolution images with relative invariance to weather and lighting conditions. SAR images are formed using a moving radar that collects data over a scene from multiple perspectives. The resulting data sets are complex-valued, with the magnitude corresponding to the reflected signal intensity of the scene and the phase indicating scattering properties.

One application of SAR is change detection, which utilizes two SAR data collections of the same scene at different times to infer changes that have occurred between the data collections. Traditional SAR change detectors employ either (1) non-coherent intensity change detection, or (2) coherent change detection. Traditional non-coherent intensity change detection utilizes changes in the magnitude of SAR images to indicate large-scale changes, such as the appearance of a sizeable object during the second data collection that was not present during the first. Traditional coherent change detection (CCD) uses SAR phase as well as magnitude to estimate the coherence between the two SAR images. CCD requires the two image collections to use identical collection geometries, so that each respective image phase is aligned, leading to the detection of smaller-scale changes, such as those made by a vehicle driving on a soft surface.

Traditional coherence magnitude detectors are biased, particularly when the true coherence is small. Although this bias can be reduced by an increase in the number of samples, in practice, increasing the number of samples for each spatial location in a pair of SAR images reduces the effective spatial resolution of the resulting CCD image, making detection of small-scale changes more difficult. Furthermore, as the size of the sample window increases, the assumption that the samples are drawn independently from the same distribution is less likely to be met. Therefore, there is a need for improved SAR change detection.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, a method is provided to detect changes in a scene over time using first and second images of the scene. For the method, a non-coherent intensity change detector detects large-scale changes between the first image and the second image and generates a large-scale change value for pairs of corresponding pixel locations in the first and second images. If the large-scale change value for a given pair of pixel locations reaches a threshold, a coherent change detector is used to detect small-scale changes between the first and second images. A small-scale change value is generated for the given pairs of pixel locations in the first and second images. A composite change value is generated by combining the large-scale change value and the small-scale change value for each pixel pair. The change thresholds might be determined theoretically or heuristically. The change thresholds are used to determine whether a change in the scene has occurred over the time period.

In another aspect, a change detection system is provided for detecting changes in a scene over a time period. The change detection system includes a processor to receive a first image of the scene at a first time and a second image of the scene at a second, different time. A non-coherent intensity change detector (i) detects large-scale changes between the first image and the second image, and (ii) generates a large-scale change value for pairs of corresponding pixel locations in the first and second images. A coherent change detector (i) detects small-scale changes between the first image and the second image in response to the large-scale change value for each pair of corresponding pixel locations reaching a selected large-scale change threshold, and (ii) generates a small-scale change value for selected ones of the pairs of corresponding pixel locations in the first and second images. The processor generates a composite change value by combining the large-scale change value and the small-scale change value for each pixel pair. The processor performs the combining by determining (i) the large-scale change threshold, (ii) a small-scale change threshold, and (iii) a composite change threshold. The processor combines, based on the determined large-scale change threshold and the heuristically determined small-scale change threshold, the large-scale change value and the small-scale change value for each pixel pair, and determines, based on the determined composite change threshold, whether a change in the scene has occurred over the time period.

In another aspect, a non-transitory machine-readable storage medium includes program code encoded thereon. When the program code is executed by a machine, the machine implements a method of detecting changes in a scene over a time period. The method includes using an imaging system to obtain a first image of the scene at a first time and a second image of the scene at a second, different time. A non-coherent intensity change detector detects large-scale changes between the first image and the second image. A large-scale change value is generated for pairs of corresponding pixel locations in the first and second images. In response to the large-scale change value for each pair of corresponding pixel locations reaching a selected large-scale change threshold, a coherent change detector detects small-scale changes between the first image and the second image. A small-scale change value is generated for selected ones of the pairs of corresponding pixel locations in the first and second images. A composite change value is generated by combining the large-scale change value and the small-scale change value for each pixel pair. The large-scale change value and the small-scale change value are combined by determining (i) the large-scale change threshold, (ii) a small-scale change threshold, and (iii) a composite change threshold. The large-scale change value and the small-scale change value for each pixel pair are combined based upon the determined large-scale change threshold and the heuristically determined small-scale change threshold. Based on the determined composite change threshold, it is determined whether a change in the scene has occurred over the time period.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 1 is a diagram of an illustrative Synthetic Aperture Radar (SAR) detection scenario input to a change detector operating in accordance with described embodiments;

FIG. 2 is a diagram of an illustrative Magnetic Resonance Imaging (MRI) detection scenario input to a change detector operating in accordance with described embodiments;

FIG. 3 is a block diagram of an illustrative change detector in accordance with described embodiments;

FIG. 4 is a flow diagram of an illustrative detection process of the change detector of FIG. 3;

DETAILED DESCRIPTION

Figure 5A:
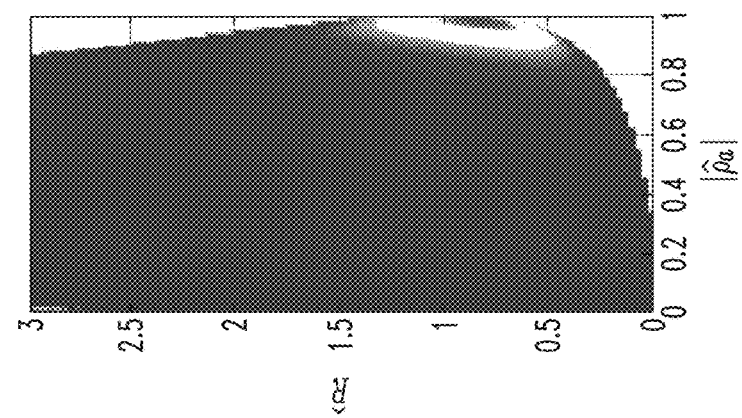
FIGS. 5A, 5B and 5C are plots of a joint density function of the change detector shown in FIG. 3.

Accurate estimation of coherence from a limited number of samples is a challenging problem. As described herein, a two-stage change detector employing both non-coherent and coherent techniques for change detection can improve both large- and small-scale change detection. First, non-coherent intensity change detection is employed to detect large-scale changes. Second, coherent change detection using a coherence estimator is utilized to detect small-scale changes. Further, employing an alternative coherence estimator to the traditional estimator based on the Pearson correlation coefficient yields improved coherence estimation and change detection performance. The non-coherent intensity change statistic is given by the sample variance ratio, and the coherent intensity change is given by the maximum likelihood estimator that assumes equal or near equal population variances. By applying the non-coherent intensity change detection first, only data sets having nearly equal variances are analyzed by the coherent change detector, improving performance. Further, thresholds for determining whether changes have occurred are heuristically generated.

Thus, described embodiments allow detection of changes between two separate images of a substantially identical area separated by a duration of time. The embodiments detect non-coherent changes caused by the displacement of a sizable object, as well as coherent changes that are on the order of a radar wavelength, which is much smaller than the spatial resolution of the images.

The concepts, systems and processes described herein enable accurate detection of subtle changes between two images and does not require prior knowledge (learning) of the type of changes to be sought. The efficacy is shown by detecting various levels of changes such as car displacements, tire tracks, and footprints in complex SAR data.

Coherent change detection using paired synthetic aperture radar images is often performed using a classical coherence estimator that is invariant to the true variances of the populations underlying each paired sample. Such estimators are biased and require a significant number of samples to yield good performance. However, increasing sample size often results in decreased image resolution.

Described embodiments employ a two-stage change detector to combine a non-coherent intensity change statistic given by the sample variance ratio and an alternative Berger estimator for paired samples having equal or near equal population variances. The first stage detector identifies pixel pairs that have non-equal variances as changes caused by the displacement of sizable object. The pixel pairs that are identified to have equal or near equal variances in the first stage are used as an input to the second stage that uses the alternative Berger coherence estimator to detect subtle changes such as tire tracks and footprints. Employing the alternative Berger coherence estimate only for pixel pairs having equal or near equal variances, described embodiments employ the same number of pixels but effectively double the sample support without sacrificing resolution. Further, the alternative Berger estimator is insulated from inequality of population variances. Described embodiments yield higher contrast change detection images for SAR change detection.

Thus, embodiments described herein detect changes in a scene over time using first and second images of the scene. A non-coherent intensity change detector detects large-scale changes between the first image and the second image and generates a large-scale change value for pairs of corresponding pixel locations in the first and second images. If the large-scale change value for a given pair of pixel locations reaches a threshold, a coherent change detector is used to detect small-scale changes between the first and second images. A small-scale change value is generated for the given pairs of pixel locations in the first and second images. A composite change value is generated by combining the large-scale change value and the small-scale change value for each pixel pair. The change thresholds might be determined theoretically or heuristically. The change thresholds are used to determine whether a change in the scene has occurred over the time period.

Although the concepts, systems and processes described herein are generally described herein as being used with Synthetic Aperture Radar (SAR) images, the described concepts, systems and processes could be applied to comparing images generated by other imaging technologies, such as aerial or satellite radar or optical imaging, computed tomography (CT) imaging, Magnetic Resonance Imaging (MRI), ultrasound imaging, or other similar imaging systems. Further, although described herein as detecting changes in images, described embodiments might also detect changes in video data (or frames of video data), for example in surveillance systems where robust detection is needed. In addition to being used to track enemy movements in military applications, such change detection might be advantageously employed to detect ground disturbances, oil spills, water or air quality, vehicle displacements, environmental changes such as weather, earth, forest, and glacier movement, medical imaging, and any other video or image analysis that might require detecting both large- and small-scale changes.

For example, FIG. 1 shows an illustrative change detection scenario. Depiction 100 shows an image capture system 106, for example a surveillance aircraft or drone aircraft, capturing a first image 108a of observation area 110 at a first time ("time 1"). Depiction 102 shows that at a second, subsequent time ("time 2") to capturing first image 108a, unobserved activity 112 occurs within observation area 110. For example, as shown in 102, vehicles might drive into observation area 110 leaving tire tracks, and people might walk into observation area 110 leaving footprints, as shown. Depiction 104 shows that, at a third time subsequent to the capturing of image 108a and unobserved activity 112 ("time 3"), image capture system 106 captures a second image, 108b, of observation area 110. As shown, second image 108b might include evidence of unobserved activity 114, such as tire tracks, footprints and other relatively small-scale changes from image 108a.

Similarly, FIG. 2 shows a second illustrative change detection scenario. First image 200 is, for example, an MRI image of a human brain. Second image, 202, is an MRI image of the same human brain, taken at a later time, in which lesion 204 is now present. Although described herein as detecting changes between a first image and a second image, it would be apparent to a skilled artisan that comparisons could be made between any number of images to detect changes over an elapsed time period that was captured in a series of images.

For the illustrative cases shown in FIGS. 1 and 2, described embodiments employ both a non-coherent change detector to detect large-scale changes between the first image (e.g., 108a or 200, respectively) and the second image (e.g., 108b or 202, respectively). A coherent change detector is then applied to detect small-scale changes between the images for pixel pairs that have equal or near-equal variances. The output of the non-coherent change detector and the coherent change detector stages are combined to form the final change detection result.

Referring now to FIG. 3, change detector 300 includes intensity (or non-coherent) change detector 304 coupled to coherent change detector 308. Intensity change detector 304 receives pixel pairs (f, g) 302, where pixel f is from a first image of an observation area (for example, image 108a of FIG. 1, or image 200 of FIG. 2), and pixel g is from a second image of the observation area (for example, image 108b of FIG. 1, of image 202 of FIG. 2). Pixels f and g correspond to the same location of the observation area, for example by having the same pixel coordinate locations in the first and second images.

Intensity change detector 304 compares variances between the corresponding pixels f and g of the first and second images and generates a large-scale change value, $\hat{R}$, based on a ratio of the variances. As shown in FIG. 3, $\sigma_f$ is a standard deviation value of the first image and $\sigma_g$ is a standard deviation value of the second image. When $\sigma_f$ is not equal to $\sigma_g$ for pixel pair (f, g), there is a large-scale change between pixel f and pixel g (e.g., there is a large-scale change between the first and second images at the location corresponding to pixel pair (f, g)). Thus, when $\sigma_f$ is not equal to $\sigma_g$ for pixel pair (f, g), intensity (or non-coherent) change detector 304 generates the large-scale change value, $\hat{R}$, shown as large-scale change output 314.

When $\sigma_f$ is equal, or nearly equal, to $\sigma_g$ for pixel pair (f, g), there is not a large-scale change between pixel f and pixel g (e.g., there is not a large-scale change between the first and second images at the location corresponding to pixel pair (f, g)). Thus, when $\sigma_f$ is equal, or nearly equal, to $\sigma_g$ for pixel pair (f, g), non-coherent change detector 304 provides pixel pair (f, g), shown as output 306, to coherent change detector 308 to determine whether a small-scale change has occurred for pixel pair (f, g). Coherent change detector 308 generates small-scale change value, $|\hat{\rho}_a|$ 312, based on a correlation coefficient of pixel pair (f, g) of the first and second images. In cases, where no small-scale change is detected, for example when $|\rho|\approx 1$, coherent change detector 308 generates output 310 indicating that no change was detected for pixel pair (f, g). Although described herein as grouping and comparing image and/or pixel pairs, any number could be employed such that some embodiments group and compare more than two images or pixels.

Large-scale change value, $\hat{R}$ 314, and small-scale change value, $|\hat{\rho}_a|$ 312, are combined by combiner 316 to produce total change output 318. Total change output 318 is thus a composite change value based on any large-scale change in pixel pair (f, g) detected by non-coherent change detector 304 and any small-scale change in pixel pair (f, g) detected by coherent change detector 308. Thus, for each pixel pair (f, g) in the compared images, change detector 300 generates total change output 318 indicating a composite large- and small-scale change value detected for each pixel pair. In some embodiments, change detector 300 might also generate a no change output 310 for pixel pairs (f, g) that do not have a detected change. For example, no change output 310 might have a value representing that no change was detected for the given pixel pair. In other embodiments, no change output 310 might be included in total change output 318, for example by combining no change output 310 with total change value 318 by combiner 316. Described embodiments thus can detect both large-scale and small-scale changes in images without needing prior knowledge of the types of changes to be detected.

Combiner 316 might generate total change output 318 by adding large-scale change value, $\hat{R}$ 314, and small-scale change value, $|\hat{\rho}_a|$ 312, and in some embodiments, no change output 310. In other embodiments, the change values 310, 312, and 314 might be combined into a matrix or array, in yet others, other computations might be made, for example averaging, multiplying or dividing the various change values to generate total change output 318.

FIG. 4 shows a flow diagram of process 400 employed by change detector 300 of FIG. 3. At block 402, change detection process 400 begins. At block 404, one or more images of a scene under observation are obtained by an imaging system over an elapsed time period. For example, as described herein, surveillance images or medical images of a scene under observation might be obtained at a first time and one or more subsequent times. At block 406, change detector 300 generates a large-scale change threshold, a small-scale change threshold, and a composite change threshold. The thresholds are employed by change detector 300 to determine whether changes exist between the images. For example, the large-scale change threshold is employed by non-coherent change detector 304 to determine whether a large-scale change (e.g., an intensity variance) exists between pixel pairs (f, g). Similarly, the small-scale change threshold is employed by coherent change detector 308 to determine whether a small-scale change (e.g., a phase variance) exists between pixel pairs (f, g) that did not exhibit a large-scale change. The composite change threshold is employed by change detector 300 to determine whether the composite of the detected large-scale change and the detected small-scale change for pixel pairs (f, g) indicates that a change has occurred between the compared images. In some embodiments, the change thresholds are heuristically determined by change detector 300. In other embodiments, the change thresholds are theoretically determined and provided to change detector 300. In yet other embodiments, initial change thresholds are theoretically determined and provided to change detector 300, and then adjusted heuristically over time as images are compared.

At block 408, images are grouped into pairs and pixel pairs are generated such that a pixel at a given location in a first image is paired with the pixel located at the same location in the subsequent image. Non-coherent change detector 304 compares variances between the corresponding pixels f and g of the first and second images and generates a large-scale change value based on the ratio of the variances. Non-coherent change detector 304 compares the determined variance ratio for the pixel pair to the large-scale change threshold. At block 410, if the determined variance ratio for the pixel pair has reached the large-scale change threshold, then at block 414, the large-scale change value is output from non-coherent change detector 304 and provided to combiner 316 to generate the composite change value for the given pixel pair.

At block 410, if the determined variance ratio for the pixel pair has not reached the large-scale change threshold, then at block 412, non-coherent change detector 304 provides the pixel pair to coherent change detector 308 to detect a small-scale change. At block 412, coherent change detector 308 generates a correlation coefficient of based on phase differences between pixel pair (f, g) and generates a small-scale change value based on the correlation coefficient. Coherent change detector 308 compares the small-scale change value for the pixel pair to the small-scale change threshold. At block 414, if the determined small-scale change value for the pixel pair has reached the small-scale change threshold, then at block 418, the small-scale change value is output from coherent change detector 308 and provided to combiner 316 to generate the composite change value for the given pixel pair. At block 414, if the determined small-scale change value for the pixel pair has not reached the small-scale change threshold, then at block 416, the no change value (e.g., 310) is output from coherent change detector 308 and provided to combiner 316 to generate the composite change value for the given pixel pair at block 418.

At block 420, the composite change value generated by combiner 316 is compared to the composite change threshold. If, at block 420 the composite change value has reached the composite change threshold, then at block 422, change detector 300 indicates that a change has occurred for the pixel pair and provides the images for further processing. Process 400 proceeds to block 424. If, at block 420 the composite change value has not reached the composite change threshold, then process 400 proceeds to block 424. At block 424, process 400 completes for the given pixel pair. If additional pixels remain to be processed, blocks 410-424 are repeated until all pixel pairs are processed for the given images.

For embodiments detecting changes in SAR image data, SAR data is often assumed to be collections of spatially uncorrelated pixels drawn from a zero-mean circularly complex Gaussian distribution. The statistic used to estimate change in SAR data sets, corresponding to the estimated coherence between a pair of SAR observations, is thus a random variable depending on the true underlying coherence as well as the number of samples employed in coherence estimation.

Given two spatially registered SAR data sets, f and g of N pixels, a joint data vector can be represented by X=[f,g]$^T \in C^{N \times 2}$. The N sample pairs of observations, $X_k$=[$f_k$,$g_k$], k=1, 2, . . . , N, are viewed as independent samples from a zero-mean, bivariate, complex Gaussian distribution with covariance matrix represented by:

$$\Sigma = \mathbb{E}(XX^H) = \begin{bmatrix} \hat{\sigma}_f^2 & \hat{\rho}\hat{\sigma}_f\hat{\sigma}_g \\ \hat{\rho}\hat{\sigma}_f\hat{\sigma}_g & \hat{\sigma}_g^2 \end{bmatrix} \quad (1)$$

where $$\sigma_f^2 = \mathbb{E}(|f|^2), \sigma_g^2 = \mathbb{E}(|g|^2), \rho = \frac{\mathbb{E}(fg^H)}{\sqrt{\mathbb{E}(|f|^2)\mathbb{E}(|g|^2)}} \quad (2)$$

Here, $\rho$ is the complex correlation coefficient, and $\vec{\rho}$ denotes its complex conjugate. The covariance matrix $\Sigma$ is typically estimated by the maximum likelihood estimator represented by $$\frac{1}{N}\sum_{k=1}^{N} X_k X_k^H = \frac{1}{N}\begin{bmatrix} \sum_k |f_k|^2 & \sum_k f_k g_k^H \\ \sum_k f_k^H g_k & \sum_k |g_k|^2 \end{bmatrix} \quad (3)$$

$$\equiv \begin{bmatrix} \hat{\sigma}_f^2 & \hat{\rho}\hat{\sigma}_f\hat{\sigma}_g \\ \hat{\rho}\hat{\sigma}_f\hat{\sigma}_g & \hat{\sigma}_g^2 \end{bmatrix} \overset{\Delta}{=} \frac{1}{N}A,$$

whose distribution is given by a bivariate complex Wishart density, represented by $$p(A; \Sigma, N) = \frac{|A|^{N-2}\exp(-\text{tr}(\Sigma^{-1}A))}{\pi\Gamma(N)\Gamma(N-1)|\Sigma|^N} \quad (4)$$

The function p(A; $\Sigma$, N) is defined over the domain where A is Hermitian positive definite. In practice, A is obtained using a spatial window of $f_k$ and $g_k$ in the respective SAR images.

Non-coherent intensity based change detection between remote sensing images is often achieved using one of two operations: subtracting the two images to identify change as a large difference, or dividing the two images to identify change as a quotient that significantly deviates from unity. SAR change detection uses the quotient approach: change is estimated using the result of dividing one magnitude image by the other. Specifically, a variance at one location in f is estimated using a spatial window and the corresponding variance of g is estimated, and the change statistic is represented by $$\hat{R} = \frac{\hat{\sigma}_f^2}{\hat{\sigma}_g^2} \quad (5)$$

Values of $\hat{R}$ that differ substantially from one are labeled as a detected change. This statistic is frequently used to test if the underlying variances of two populations are different. The probability density function of $\hat{R}$ is represented by:

$$p(\hat{R}; R, |\rho|, N) = \frac{\hat{R}^{N-1}(\hat{R}+R)R^N(1-|\rho|^2)^N}{B(N,N)\left[(\hat{R}+R)^2 - 4R\hat{R}|\rho|^2\right]^{N+1/2}}, \quad (6)$$

$$\hat{R} \geq 0$$

where B(N, N) is the beta function and R=$\sigma_f^2/\sigma_g^2$, (i.e., the ratio of the true variances).

Detecting different population variances is formulated as a hypothesis test, where the null hypothesis is that the two population variances are equal and the alternative hypothesis is that those populations have different variances. In the absence of correlation, the sample variance ratio $\hat{R}$ is proportional to a central $F_{2N, 2N}$ distribution if the null hypothesis $\sigma_f = \sigma_g$ is true, making this an F-test. Therefore, if the null hypothesis is true and $\rho = 0$, $$F(R|H_0) \equiv P(\hat{R} \leq R | H_0) = I_{R/(1+R)}(N,N) \qquad (7)$$

where $I_x(a, b)$ is the incomplete beta function. For a chosen test significance level $\alpha$, the upper critical value $R_{u,\alpha}$ and the lower critical value $R_{l,\alpha}$ of the $F_{2N, 2N}$ distribution can be found such that $$F(R_{u,a} | H_0) = 1 - \frac{\alpha}{2}, \quad F(R_{l,a} | H_0) = \frac{\alpha}{2}. \qquad (8)$$

A sample value of $\hat{R}$ such that $\hat{R} < R_{l,a}$ or that $\hat{R} > R_{u,a}$ results in the null hypothesis being rejected at significance level $\alpha$. When applied to SAR change detection, rejection of the null hypothesis indicates change. This test reveals large-scale changes that affect SAR magnitude values, such as a car that appears in one image but not another. Smaller scale change detection requires a different change detection method. Changes such that $\sigma_f \neq \sigma_g$ can occur for a wide range of coherence values $|\rho| \in [0, 1]$. Large-scale changes are more likely when $|\rho| = 0$. This is the basis for the method of threshold selection for $\hat{R}$.

While non-coherent change detection is generally applicable to any type of real-valued image, coherent change detection is applicable to complex data and exploits both magnitude and phase. The additional phase data allows smaller scale changes to be detected, such as tire imprints on soft soil. The small ground surface change affects radar scattering, which affects phase. The parameter that is often used to indicate this type of change is coherence $\rho$, which can be estimated according to:

$$\hat{\rho}_c = \frac{A_{12}}{\sqrt{A_{11}} \sqrt{A_{22}}}. \qquad (9)$$

Note that $A = [A_{11}, A_{12}; A_{21}, A_{22}]$ in relationship (3). The statistic $|\hat{\rho}_c|$ is a random variable distributed according to $$p(|\hat{\rho}_c|;|\rho|,N) = 2(N-1)(1-|\rho|^2)^N |\hat{\rho}_c|(1-|\hat{\rho}_c|^2)^{N-2} {}_2F_1(N,N;1;|\rho|^2|\hat{\rho}_c|^2) \qquad (10)$$

where ${}_2F_1(\bullet, \bullet; \bullet; \bullet)$ is the Gauss hypergeometric function. This distribution is invariant to $\sigma_f$ and $\sigma_g$, and only depends on the true underlying coherence magnitude $|\rho|$ and number of samples used in estimation N. The bias of the estimator increases with decreasing $|\rho|$ and is especially pronounced when N is small. Since the number of samples available for coherence estimation is often small in practice, this bias could affect change detection by decreasing true positives.

Note that as a single pair of SAR images is assumed available, only a limited number of samples is available to estimate coherence. The size of the spatial neighborhood can be increased to increase the effective number of samples. This can have unintended effects though, such as smoothing the eventual CCD image and resulting in missed change detection, especially for subtle ground changes. However, using a coherence estimator capable of exploiting a near equal variance scenario has the potential to effectively double the number of samples available for estimation. This could have benefits especially in the very low sample support cases (e.g., where $N \leq 5$).

As described herein, also employing an alternative coherence estimator that assumes variance equality can improve change detection performance. As change detection requires two SAR images of the same scene, the underlying variances will be near equal absent significant changes. When this equal variance assumption is met, the natural estimator of the complex correlation coefficient $\rho$, denoted $\hat{\rho}_a$, can be written as a function of the elements of A as $$\hat{\rho}_a = \frac{2A_{12}}{(A_{11} + A_{22})} \qquad (11)$$

The denominator of (11) contains a sum rather than a product of two random variables, suggesting a more stable estimator. Furthermore, since this estimator assumes both variance terms are equal, the number of samples used to estimate the true variance is potentially doubled. In scenes where most of the underlying variance remains unchanged, this estimator can be expected to offer improved properties over the classical estimator $\hat{\rho}_c$ of relationship (9).

The expression for the probability density function of estimated coherence magnitude $|\rho|$ is given by:

$$p(|\hat{\rho}_a|;|\rho|,N) = (2N-1)(1-|\rho|^2)^N |\hat{\rho}_a|(1-|\hat{\rho}_a|^2)^{N-1/2} {}_2F_1(N,N+\frac{1}{2};1;|\rho|^2|\hat{\rho}_a|^2) \qquad (12)$$

This assumes $\sigma_f = \sigma_g$ and only parameterized by $|\rho|$ and N. The distribution of $|\hat{\rho}_a|$ for a fixed N and $|\rho|$ has a modestly lower bias as its peak is closer to the true coherence value than the distribution of $|\hat{\rho}_c|$. For large values of N, both probability distributions tend toward $E[|\rho|]$. These results hint that better estimation is possible using $|\hat{\rho}_a|$, however, concluding $|\hat{\rho}_a|$ outperforms $|\hat{\rho}_c|$ requires further analysis of the mean squared error for both estimators.

The behavior of both coherence estimators can be examined by computing their mean squared error (MSE). The MSE of an estimator $|\hat{\rho}|$ is defined as $$MSE(|\hat{\rho}|) = \mathbb{E}[(|\hat{\rho}| - |\rho|)^2] \qquad (13)$$

$$= \int_0^1 (|\hat{\rho}| - |\rho|)^2 p(|\hat{\rho}|) \, d|\hat{\rho}|.$$

Assuming $\sigma_f = \sigma_g$ and using relationship (10), the MSE of $|\hat{\rho}_c|$ can be written as $$\mathbb{E}[(|\hat{\rho}_c| - |\rho|)^2] = 2(N-1)(1-|\rho|^2)^N \qquad (14)$$

$$\int_0^1 (|\hat{\rho}_c| - |\rho|)^2 |\hat{\rho}_c|(1-|\hat{\rho}_c|^2)^{N-2} \cdot {}_2F_1(N, N; 1; |\rho|^2|\hat{\rho}_c|^2) d|\hat{\rho}_c| =$$

$$2(N-1)(1-|\rho|^2)^N$$

$$\left[ \int_a^1 |\hat{\rho}_c|^3 (1-|\hat{\rho}_c|^2)^{N-2} \cdot {}_2F_1(N, N; 1; |\rho|^2|\hat{\rho}_c|^2) d|\hat{\rho}_c| - \right.$$

$$\int_0^1 2|\rho||\hat{\rho}_c|^2 (1-|\hat{\rho}_c|^2)^{N-2} \cdot {}_2F_1(N, N; 1; |\rho|^2|\hat{\rho}_c|^2) d|\hat{\rho}_c| +$$

$$\left. \int_0^1 |\rho|^2 |\hat{\rho}_c|(1-|\hat{\rho}_c|^2)^{N-2} \cdot {}_2F_1(N, N; 1; |\rho|^2|\hat{\rho}_c|^2) d|\hat{\rho}_c| \right].$$

Following that $$\int_0^1 (1-x)^{\mu-1} x^{\nu-1} {}_pF_q(a_1, \ldots, a_p; b_1, \ldots, b_q; ax) dx = \quad (14a)$$

$$\frac{\Gamma(\mu)\Gamma(\nu)}{\Gamma(\mu+\nu)} {}_{p+1}F_{q+1}(\nu, a_1, \ldots, a_p; \mu+\nu, b_1, \ldots, b_q; a)$$

where $\Gamma(\cdot)$ is the Gamma function and ${}_pF_q(\cdot, \cdot; \cdot; \cdot)$ is the generalized hypergeometric function, the analytical expression for the MSE of $|\hat{\rho}_c|$ is $$\mathbb{E}[(|\hat{\rho}_c| - |\rho|)^2] = \quad (15)$$

$$\Gamma(N)(1-|\rho|^2)^N \cdot \left[ \frac{\Gamma(2)}{\Gamma(N+1)} {}_3F_2(2, N, N; N+1, 1; |\rho|^2) - \right.$$

$$2|\rho| \frac{\Gamma\left(\frac{3}{2}\right)}{\Gamma\left(N+\frac{1}{2}\right)} {}_3F_2\left(\frac{3}{2}, N, N; N+\frac{1}{2}, 1; |\rho|^2\right) +$$

$$\left. |\rho|^2 \frac{1}{\Gamma(N)} {}_3F_2(1, N, N; N, 1; |\rho|^2) \right];$$

Similarly, the MSE of $|\hat{\rho}_a|$ is given by $$\mathbb{E}[(|\hat{\rho}_a| - |\rho|)^2] = \Gamma\left(N + \frac{1}{2}\right) \quad (16)$$

$$(1-|\rho|^2)^N \cdot \left[ \frac{\Gamma(2)}{\Gamma\left(N+\frac{3}{2}\right)} {}_3F_2\left(2, N, N+\frac{1}{2}; N+\frac{3}{2}, 1; |\rho|^2\right) - \right.$$

$$2|\rho| \frac{\Gamma\left(\frac{3}{2}\right)}{\Gamma(N+1)} {}_3F_2\left(\frac{3}{2}, N, N; N+\frac{1}{2}, N+1, 1; |\rho|^2\right) +$$

$$\left. |\rho|^2 \frac{1}{\Gamma\left(N+\frac{1}{2}\right)} {}_3F_2\left(1, N, N+\frac{1}{2}; N+\frac{1}{2}, 1; |\rho|^2\right) \right]$$

The MSE values of $|\hat{\rho}_a|$ are typically less than the MSE values of $|\hat{\rho}_c|$, especially when $|\rho|$ is low (i.e., change has occurred). MSE($|\hat{\rho}_a|$)<MSE($|\hat{\rho}_c|$) when the coherence is low, especially when a small number of samples is used for estimation. For large values of N, the changeover point has been observed to be $|\rho|\approx 0.7$.

From this MSE analysis, we can conclude that $|\hat{\rho}_a|$ is better than $|\hat{\rho}_c|$ for change detection at least when $\sigma_f \approx \sigma_g$ (a condition for which the first stage detector screens) and $|\rho|\leq 0.7$. Change, the state of interest in change detection, is represented by $\rho\approx 0$, where MSE($|\hat{\rho}_a|$)<MSE($|\hat{\rho}_c|$). Second, the size of N is limited in practice in SAR coherent change detection (CCD), which leads to MSE($|\hat{\rho}_a|$)<MSE($|\hat{\rho}_c|$) for more values of $|\rho|$. Finally, change detection error is not equal to coherence estimation error. The magnitude of the difference in estimation errors is small for large values of $|\rho|$, where MSE($|\hat{\rho}_a|$)>MSE($|\hat{\rho}_c|$). For other values of $|\rho|$, especially small values (i.e., $|\rho|=0.2$), the MSE for $|\hat{\rho}_a|$ is more than two tenths smaller than the MSE for $|\hat{\rho}_c|$. The MSE analysis is valid when the assumption that $\sigma_f = \sigma_g$ is met. Therefore, the two-stage change detector described herein that applies intensity change detection so that only samples such that $\sigma_f \neq \sigma_g$ are passed to the second stage $|\hat{\rho}_a|$, is superior to previous change detectors.

Coherence and intensity ratio statistics are used separately to detect change at different scales, but if change detection, regardless of scale, is the goal, these statistics should be combined to reveal change at all scales. Combining the statistics has the additional benefit of testing first for equal variance, justifying the assumption of equal variance in order to use a more accurate coherence estimator, specifically, the alternative coherence estimator. The combined test provides better change detection than either statistic alone.

In order to detect change pixels at all scales, we first apply the non-coherent intensity change detector $\hat{R}$ that identifies pixel pairs with large variance changes (i.e., $\sigma_f \neq \sigma_g$) such that good SAR change detection image contrast is achieved. The pixel pairs that are identified to have equal or near equal variances in the first stage are used as an input to the second stage. This leads to most pairs entering the second stage having nearly equal variance. The second stage test uses the alternative coherence estimator $|\hat{\rho}_a|$ to detect subtle changes. The output of the first and the second stages, large-scale change and small-scale change, respectively, are combined to form the final change detection result.

It can be shown that for arbitrary positive values of $\sigma f$, $\sigma g$, $|\rho|\leq 1$, and N, the exact joint probability density function of $|\hat{\rho}_a|$ and $\hat{R}$ is given by:

$$p(|\hat{\rho}_a|, \hat{R}) = \frac{(1-|\rho|^2)^N \Gamma(2N)}{\Gamma(N)\Gamma(N-1)} \frac{|\hat{\rho}_a|}{2(\hat{R}+1)^2} \cdot \quad (17)$$

$$\left[ \frac{1}{\hat{R}+1}\left(1 - \frac{1}{\hat{R}+1}\right) - \frac{|\hat{\rho}_a|^2}{4} \right]^{N-2} \cdot \left[ |\hat{\rho}_a||\rho| + \frac{\sigma_g^2 \hat{R} + \sigma_f^2}{(\hat{R}+1)\sigma_f \sigma_g} \right]^{-2N} \cdot$$

$$ {}_3F_1\left(\frac{1}{2}, 2N, 1, \frac{2|\hat{\rho}_a||\rho|}{|\hat{\rho}_a||\rho| + \frac{\sigma_g^2 \hat{R} + \sigma_f^2}{(\hat{R}+1)\sigma_f \sigma_g}}\right) \text{ subject to}$$

$$|\hat{\rho}_a| \leq [4\hat{R}/(\hat{R}+1)^2]^{\frac{1}{2}}, 0 \leq \hat{R} < \infty. \quad (18)$$

Figure 5B:
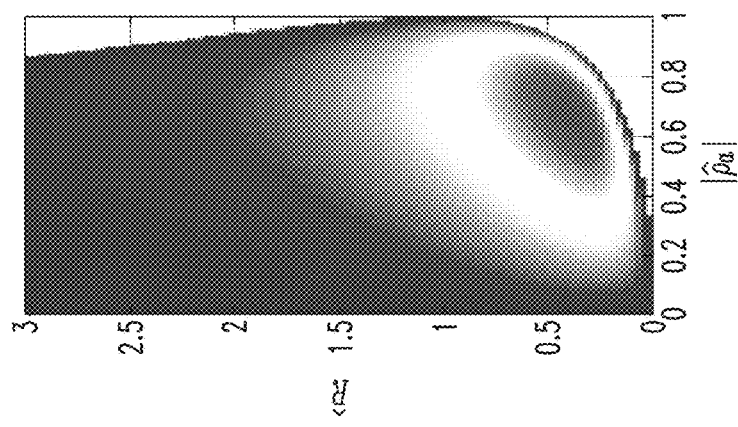
Figure 5C:
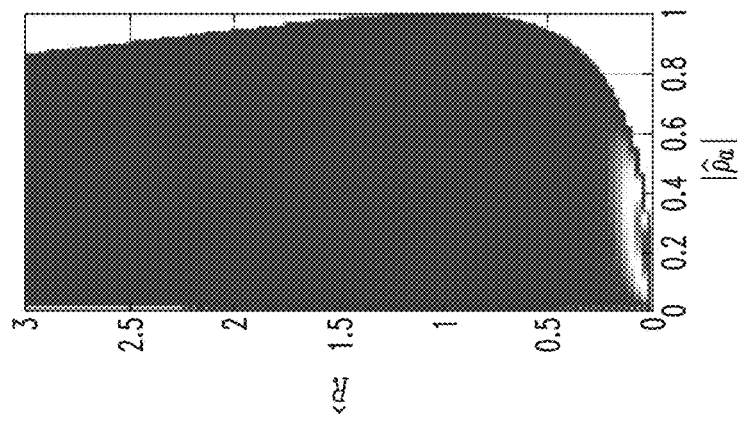

Note that $p(|\hat{\rho}_a|, \hat{R})$ is only non-zero in the domain where relationship (18) holds as shown in FIG. 5. FIG. 5 shows plots for $p(|\hat{\rho}_a|, \hat{R})$ 500, 502 and 504, where N=3 (e.g., the number of samples). In plot 500, R=0.1 and $|\rho|=0.1$. In plot 502, R=0.75 and $|\rho|=0.4$. In plot 504, R=0.9 and $|\rho|=0.9$. Recall that R is the ratio of the true variances, such that as R approaches 1, a large-scale change is less likely since the images have less variance. Similarly, $|\rho|$ is the complex correlation coefficient, such that when $|\rho|$ is less than 1, a small-scale change is more likely. When $|\rho|$ equal or nearly equal to 1, no change between the images is most likely. With $p(|\hat{\rho}_a|, \hat{R})$, the probability of detection and the probability of false alarm as a function of detection thresholds in each stage can be computed.

Described embodiments provide a heuristic approach to choosing thresholds due to the integral of relationship (17) being non-trivial to be solved analytically. The two-stage change detection can be described as two sequential hypothesis tests involving data based estimates of $\sigma_f$ and $\sigma_g$ in the first stage, and $|\rho|$ in the second stage. We can write the hypothesis tests as $$H_0^{1st}: \quad \sigma_f \approx \sigma_g \quad H_1^{1st}: \quad \sigma_f \neq \sigma_g \quad (19)$$
$$H_0^{2nd}: \quad |\rho| \approx 1 \quad H_1^{2nd}: \quad |\rho| \lesssim 1 \quad .$$

The null hypothesis of the first stage test is that the population variances are equal or near equal and the alternative hypothesis is that those populations have different variances. The null hypothesis in the second stage test is that $|\rho| \approx 1$ and the alternative hypothesis is that $|\rho| \lesssim 1$. Given the two sets of hypothesis tests, the final hypothesis tests of the two-stage change detector is shown in Table I.

TABLE 1

FINAL HYPOTHESIS TESTS OF THE TWO-STAGE CHANGE DETECTION

|  | $\sigma_f \approx \sigma_g$ | $\sigma_f \neq \sigma_g$ |
|---|---|---|
| $\|\rho\| \approx 1$ | $H_0$ | $H_1$ |
| $\|\rho\| \lesssim 1$ | $H_1$ | $H_1$ |

In the first stage, $\sigma_f \neq \sigma_g$ constitutes change, more specifically a large-scale change. The sample pairs that are identified to have $\sigma_f \approx \sigma_g$ in the first stage are passed to the second stage. In the second stage, the sample pairs with $\sigma_f \approx \sigma_g$ and $|\rho| \lesssim 1$ represents change, more specifically a small-scale change, and the sample pairs with $\sigma_f \approx \sigma_g$ and $|\rho| \approx 1$ represents no change. The small-scale change and the large-scale change are combined to form the final change $H_1$ and the no change output from the second stage is used to form the final no change $H_0$.

Among the two sets of hypothesis tests $H^{1st}$ and $H^{2nd}$, there are four possible outcomes: $H_0^{1st}+H_0^{2nd}$, $H_0^{1st}+H_1^{2nd}$, $H_1^{1st}+H_0^{2nd}$, and $H_1^{1st}+H_1^{2nd}$. $H_0^{1st}+H_0^{2nd}$ indicates the final no change $H_0$, and $H_0^{1st}+H_1^{2nd}$ represents a subset of the final change $H_1$. Both $H_1^{1st}+H_1^{2nd}$ and $H_1^{1st}+H_0^{2nd}$ represent a subset of $H_1$, however it is unlikely to observe sample pairs under $H_1^{1st}+H_0^{2nd}$. This is unlikely because any large-scale change will affect phase, leading to small-scale changes as well. The unlikely outcome can be seen theoretically via the constraint of $p(|\hat{\rho}_a|, \hat{R})$ in relationship (18). The constraint implies $|\hat{\rho}_a| \leq 2\sqrt{\epsilon}$ for $\hat{R} \approx \epsilon > 0$, where $\epsilon$ is a small positive infinitesimal quantity. This also implies high $|\rho|$ is unlikely to occur with R far from unity.

Thresholds for a detection problem are traditionally determined assuming the null hypothesis is true. Similarly, the thresholds $R_{l,\alpha}$ and $R_{u,\alpha}$ of the first stage test are determined assuming $H_0^{1st}$ is true, i.e. $\sigma_f \approx \sigma_g$. Note, however, that in practice the true parameter $|\rho|$ is unknown for selection of thresholds to guarantee an acceptance level of $\alpha$. Exploring the effects of correlation parameter $|\rho|$ on the pdf of $\hat{R}$ under H1st, it can be shown that using any value of correlation parameter such that $|\rho| \neq 0$ only decreases the variance of $\hat{R}$. That is, if we were to select thresholds of $\hat{R}$ under $H_0$ ($\sigma_f \neq \sigma_g$ and $|\rho| \approx 1$) for arbitrary $|\rho|$, the test is likely to reject near equal variance populations from entering the second stage test more often than expected. Moreover, analysis with real data suggests that choosing threshold values for $\hat{R}$ under the $\rho=0$ assumption for $\alpha=0.01$ captures prominent intensity changes between SAR images without introducing significant false alarms. Thus, $R_{l,\alpha}$ and $R_{u,\alpha}$ will be chosen according to relationship (8) so that samples declared as change in the first stage indicate prominent intensity change, and therefore immediately declared as $H_1$. The ultimate effect of using $\hat{R}$ for change detection is that more samples with $\sigma_f \neq \sigma_g$ pass to the second stage.

The alternative coherence estimator $|\hat{\rho}_a|$ is employed under the assumption that underlying variances of two populations are equal ($\sigma_f \neq \sigma_g$). When the equal variance assumption is met, we have shown that $|\hat{\rho}_a|$ has more desirable change detection properties than $|\hat{\rho}_c|$; when $|\rho|$ is low, $|\hat{\rho}_a|$ yields significantly less mean squared error than $|\hat{\rho}_c|$, and when $|\rho|$ is high, $|\hat{\rho}_a|$ yields slightly more error than $|\hat{\rho}_c|$, but the magnitude of the difference in estimation error is negligible. Therefore, it is expected that the more accurate estimation of small values of $|\rho|$ makes detecting true change more likely, and outweighs the slight increase in false alarms that corresponds to high values of A.

The behavior of $|\hat{\rho}_a|$ when $\sigma_f \neq \sigma_g$ can be explained with a direct comparison of distributional properties. Based on properties of inequality of arithmetic and geometric means, $|\hat{\rho}_a| \leq |\hat{\rho}_c|$ with equality if and only if $A_{11}=A_{22}$. In other words, the further R gets from unity, the lower $|\hat{\rho}_a|$ will become compared to $|\hat{\rho}_c|$. This leads to more likely detection of true change when $|\rho|$ is low, and conversely increasing false alarms when $|\rho|$ is high. However, it is shown from relationship (18) that $|\hat{\rho}_a| \leq [4\hat{R}/(R+1)^2]^{1/2}$ must hold. This constraint implies high $|\rho|$ is unlikely to occur with R far from one, which would be the case that would cause false alarms. Therefore, a significant improvement in change detection is expected to be observed in using $|\hat{\rho}_a|$ compared to using $|\hat{\rho}_c|$, even when the equal variance assumption is not met.

Testing detector 300 with known ground truth to compare the change detection performance of $|\hat{\rho}_a|$, $|\hat{\rho}_c|$, assume that $|\rho|=0$ with a range of values in R was chosen to indicate change, and $|\rho|=0.9$ with R=0.9 to indicate no change. To restrict the unlikely case, the variance ratio R was fixed in generating 'no change' samples, and only varied in producing 'change' samples. Note that choosing $|\rho|=1$ or R=1 would result in no variability between samples, which is not realistic in SAR data. Coherence is affected by factors other than scene change, making $|\rho|=0.9$ a reasonably high coherence value. Results in detecting change corresponding to $|\rho|=0$ with a range of values in R versus $|\rho|=0.9$ with R=0.9 were obtained using $10^5$ independent Monte Carlo trials, for sample sizes N=3 and N=6. Thresholds for the first stage test are fixed to have a 99% acceptance rate ($\alpha=0.01$) under $\sigma_f \approx \sigma_g$ and $|\rho|=0$ to avoid significant false alarms occurred in the first stage. The threshold for the second stage test is empirically determined through receiver operating characteristic (ROC) curve analysis. ROC curves are generated varying thresholds of the second stage test after fixing thresholds for the first stage.

Comparing the performance of using $|\hat{\rho}_c|$ and $|\hat{\rho}_a|$, unlike $|\hat{\rho}_a|$, $|\hat{\rho}_c|$ is invariant to $\sigma_f$ and $\sigma_g$, therefore the curves for $|\hat{\rho}_c|$ are unaffected by the different values of R. Change detection with $|\hat{\rho}_a|$ performs better than change detection using $|\hat{\rho}_c|$, not only when the true underlying variances are equal (R=1), but also when they are far apart. The performance of change detection using $|\hat{\rho}_a|$ increases as R gets further away from one, meaning a deviation from underlying assumptions unexpectedly leads to an improvement in change detection. Change detection error is not the same as coherence estimation error. Change detection with $|\hat{\rho}_a|$ can achieve a nearly 37% increase in probability of detection ($P_D$) at a 1% probability of false alarm ($P_{FA}$) compared to using $|\hat{\rho}_c|$ when R=0.1.

Since the two-stage method shown in FIG. 3 uses the intensity change detector in the first stage, and $|\hat{\rho}_a|$ in the second stage, the two-stage method curve converges to $|\hat{\rho}_a|$. The performance improvement of the two-stage method compared to $|\hat{\rho}_a|$ is especially prominent at low $P_{FA}$ and low R. The additional intensity change detection step allows the two-stage method to detect the regions of low R that leads to a higher $P_D$ at a limited $P_{FA}$ compared to other methods.

Overall change detection performance increases with N, and that, as expected with larger sample sizes, the curves tend toward the optimal operating point. However, performance increases using the two-stage method compared to using $|\hat{\rho}_a|$, especially at a limited $P_{FA}$ and low R. With R=0.1 (low R), the number of samples N=16 yields a negligible difference (<$10^{-6}$) in the area under the ROC curves between the two-stage method and $|\hat{\rho}_a|$. Similarly, the difference in the area under the curves between the two-stage method and $|\hat{\rho}_c|$ becomes negligible (<$10^{-6}$) when N=16.

Testing detector 300 using SAR data collected in Yuma, Ariz., in April 2008 using Boeing's Ku-band Compact Radar and a King Air 300 aircraft showed improved performance. An 800×400 region of a SAR image was used to compare the performance of four distinct metrics: the intensity change detector $\hat{R}$, the classical coherence estimator $|\hat{\rho}_c|$, the alternative coherence estimator $|\hat{\rho}_a|$, and the two-stage change detector 300. The changed and the unchanged scenes were determined by visual inspection and recorded as a binary mask, with N=5. Pixels that are declared as change in the first stage are masked as zero (a black pixel), and later combined with the raw output of $|\hat{\rho}_a|$. ROC curves are generated varying thresholds for the second stage after fixing thresholds for the first stage test.

By comparing the two-stage test with other metrics, the two-stage method demonstrates improved performance compared to $|\hat{\rho}_c|$. In practice, raw estimator outputs ranging from 0 to 1 are often called SAR change detection images. As there can be numerous uninteresting changes such as vegetation and radar shadows, image analysts investigate the raw outputs and manually determine regions of interesting change. In regions of both large-scale and small-scale change, the two-stage change detector 300 demonstrates higher change detection performance than the current state-of-the-art change detector $|\hat{\rho}_c|$, as well as improved change detection over either $\hat{R}$ or $|\hat{\rho}_a|$, alone.

Described embodiments provide a two-stage SAR change detector based on the use of the intensity change detector $\hat{R}$ using a sample variance ratio followed by the coherent change detector $|\hat{\rho}_a|$ that assumes equal population variances. These embodiments have better change detection performance over the current state-of-the-art change detector $|\hat{\rho}_c|$, as well as improved change detection over either $\hat{R}$ or $|\hat{\rho}_a|$, alone. The significant improvement in change detection performance was achieved due to the following reasons: (1) When R=1 and $|\rho|$ is low, $|\hat{\rho}_a|$ yields significantly less mean squared error than $|\hat{\rho}_c|$, and when R=1 and $|\rho|$ is high, $|\hat{\rho}_a|$ yields slightly more error than $|\hat{\rho}_c|$, but the magnitude of the difference in estimation error is negligible. (2) When R=1, the direct distributional properties assign lower estimated coherence to $|\hat{\rho}_a|$ than $|\hat{\rho}_a|$, therefore if $|\rho|$ is low, true change is more likely to be detected, but if $|\rho|$ is high, more false alarms are likely to be detected as change. However, the constraint of $p(|\hat{\rho}_a|, \hat{R})$ shows that such events are unlikely with low $\hat{R}$.

Thus, as described herein, embodiments detect changes in a scene over time using first and second images of the scene. A non-coherent intensity change detector detects large-scale changes between the first image and the second image and generates a large-scale change value for pairs of corresponding pixel locations in the first and second images. If the large-scale change value for a given pair of pixel locations reaches a threshold, a coherent change detector is used to detect small-scale changes between the first and second images. A small-scale change value is generated for the given pairs of pixel locations in the first and second images. A composite change value is generated by combining the large-scale change value and the small-scale change value for each pixel pair. The change thresholds might be determined theoretically or heuristically. The change thresholds are used to determine whether a change in the scene has occurred over the time period.

Figure 6:
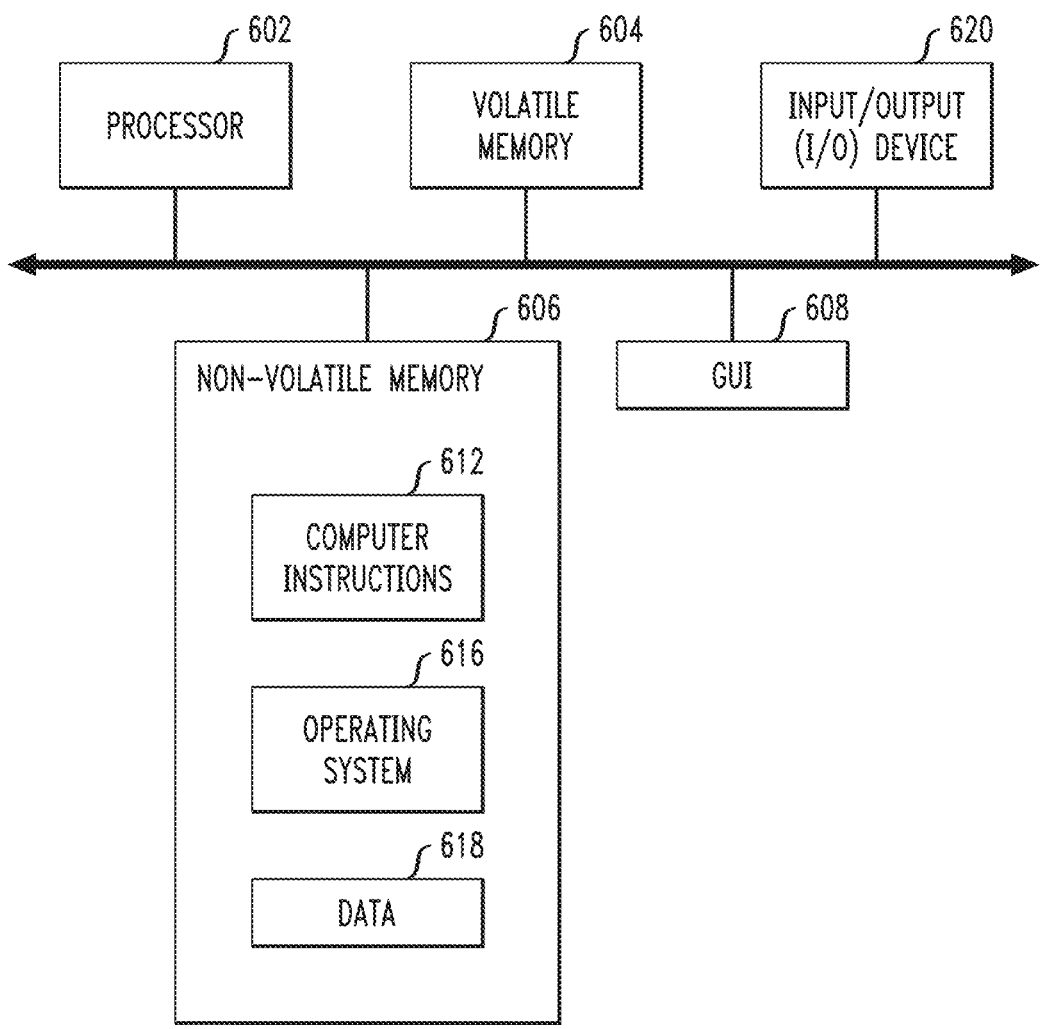
FIG. 6 is a block diagram of an example of a hardware device that may perform at least a portion of the processes in FIG. 4.

Referring to FIG. 6, in some embodiments, change detector 300 may be implemented as one or more computers. Computer 600 may include processor 602, volatile memory 604 (e.g., RAM), non-volatile memory 606 (e.g., a hard disk drive, solid state drive such as a flash drive, a hybrid magnetic and solid state drive, etc.), graphical user interface (GUI) 608 (e.g., a mouse, a keyboard, a display, and so forth) and input/output (I/O) device 620. Non-volatile memory 606 stores computer instructions 612, an operating system 616 and data 618 such that, for example, the computer instructions 612 are executed by the processor 602 out of volatile memory 604 to perform at least a portion of process 400 (FIG. 4). Program code may be applied to data entered using an input device of GUI 608 or received from I/O device 620.

Process 400 (FIG. 4) is not limited to use with the hardware and software of FIG. 6 and may find applicability in any computing or processing environment and with any type of machine or set of machines that is capable of running a computer program. Process 400 may be implemented in hardware, software, or a combination of the two.

In some embodiments, processor 602 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. Various elements, which are described in the context of a single embodiment, may also be provided separately or in any suitable subcombination.

It should be understood that the steps of the methods set forth herein are not necessarily required to be performed in the order described, and the order of the steps of such methods should be understood to be merely an example. Likewise, additional steps may be included in such methods, and certain steps may be omitted or combined, in methods consistent with various embodiments.

It will be further understood that various changes in the details, materials, and arrangements of the parts that have been described and illustrated herein might be made by those skilled in the art without departing from the scope of the following claims.

We claim:

1. An image processing method of detecting changes in a scene over a time period, the image processing method comprising:
   using an imaging system to obtain a first image of the scene at a first time and a second image of the scene at a second, different time;
   using an image processor programmed with a non-coherent intensity change detector module to analyze and detect large-scale changes between the first image and the second image;
   using the non-coherent intensity change detector module to calculate a large-scale change value for pairs of corresponding pixel locations in the first and second images;
   in response to the large-scale change value for each pair of corresponding pixel locations reaching a selected large-scale change threshold, using an image processor programmed with a coherent change detector module to analyze and detect small-scale changes between the first image and the second image;
   using the coherent change detector module to calculate a small-scale change value for selected ones of the pairs of corresponding pixel locations in the first and second images; and
   using an image processor to calculate a composite change value by combining the large-scale change value and the small-scale change value for each pixel pair, wherein the combining comprises:
      determining (i) the large-scale change threshold, (ii) a small-scale change threshold, and (iii) a composite change threshold;
      combining, based on the determined large-scale change threshold and the determined small-scale change threshold, the large-scale change value and the small-scale change value for each pixel pair; and
      determining, based on the determined composite change threshold, whether a change in the scene has occurred over the time period.

2. The method of claim 1, wherein determining the large-scale change threshold, the small-scale change threshold, and the composite change threshold comprises:
   determining a relative likelihood for the large-scale change threshold and the small-scale change threshold by assigning pseudo-random positive values for at least one of: a number of samples present in each image, a true change value, a variation value of the first image, and a variation value of the second image.

3. The method of claim 2, wherein determining (i) the large-scale change threshold, (ii) the small-scale change threshold, and (iii) the composite change threshold comprises at least one of:
   heuristically determining (i) the large-scale change threshold, (ii) the small-scale change threshold, and (iii) the composite change threshold; and
   theoretically determining (i) the large-scale change threshold, (ii) the small-scale change threshold, and (iii) the composite change threshold.

4. The method of claim 2, wherein determining a relative likelihood for the large-scale change threshold and the small-scale change threshold by assigning pseudo-random positive values for at least one of: a number of samples present in each image, a true change value, a variation value of the first image, and a variation value of the second image comprises determining the relationship given by:

$$p(|\hat{\rho}_a|, \hat{R}) = \frac{(1-|\rho|^2)^N \Gamma(2N)}{\Gamma(N)\Gamma(N-1)}$$

$$\frac{|\hat{\rho}_a|}{2(\hat{R}+1)^2}\left[\frac{1}{\hat{R}+1}\left(1-\frac{1}{\hat{R}+1}\right)-\frac{|\hat{\rho}_a|^2}{4}\right]^{N-2}\left[|\hat{\rho}_a||\rho|+\frac{\sigma_g^2\hat{R}+\sigma_f^2}{(\hat{R}+1)\sigma_f\sigma_g}\right]^{-2N}$$

$$F_{21}\left(\frac{1}{2}, 2N, 1, \frac{2|\hat{\rho}_a||\rho|}{|\hat{\rho}_a||\rho|+\frac{\sigma_g^2\hat{R}+\sigma_f^2}{(\hat{R}+1)\sigma_f\sigma_g}}\right),$$

where $$|\hat{\rho}_a| \leq \left[\frac{4\hat{R}}{(\hat{R}+1)^2}\right]^{\frac{1}{2}}, 0 \leq \hat{R} < \infty$$

and wherein $p(|\hat{\rho}_a|, \hat{R})$ is a joint density function of the coherent change detector and the non-coherent intensity change detector, $|\hat{\rho}_a|$ is the small-scale change value based on a correlation coefficient of the first and second images, $\hat{R}$ is the large-scale change value based on a ratio of variances between corresponding pixels of the first and second images, N is a number of samples present in the first and second images, $\sigma_f$ is a standard deviation value of the first image, $\sigma_g$ is a standard deviation value of the second image, and $_2F_1$ is a generalized hypergeometric function.

5. The method of claim 2, wherein determining (i) the large-scale change threshold, (ii) the small-scale change threshold, and (iii) the composite change threshold comprises at least one of:
empirically determining (i) the large-scale change threshold, (ii) the small-scale change threshold, and (iii) the composite change threshold; and
analytically determining (i) the large-scale change threshold, (ii) the small-scale change threshold, and (iii) the composite change threshold.

6. The method of claim 1, wherein the imaging system comprises a Synthetic Aperture Radar (SAR).

7. The method of claim 1, wherein the imaging system comprises a Magnetic Resonance Imaging (MRI) system.

8. The method of claim 1, wherein a large-scale change corresponds to a large difference in pixel magnitude between the second image and the first image.

9. The method of claim 1, wherein a small-scale change corresponds to a difference in phase between pixels of the second image and the first image.

10. The method of claim 1, further comprising:
in response to the composite change value for each pair of corresponding pixel locations reaching the composite change threshold, generating an indication that at least one change was detected between the first and second images; and
providing the first and second images for further processing.

11. An image processing system for detecting changes in a scene over a time period, the image processing system comprising:
an image processor configured to receive a first image of the scene at a first time and a second image of the scene at a second, different time;
an image processor programmed with a non-coherent intensity change detector module configured to (i) analyze and detect large-scale changes between the first image and the second image, and (ii) calculate a large-scale change value for pairs of corresponding pixel locations in the first and second images; and
an image processor programmed with a coherent change detector module configured to (i) analyze and detect small-scale changes between the first image and the second image in response to the large-scale change value for each pair of corresponding pixel locations reaching a selected large-scale change threshold, and (ii) calculate a small-scale change value for selected ones of the pairs of corresponding pixel locations in the first and second images;
an image processor configured to calculate a composite change value by combining the large-scale change value and the small-scale change value for each pixel pair, wherein to perform the combining the processor is configured to:
determine (i) the large-scale change threshold, (ii) a small-scale change threshold, and (iii) a composite change threshold;
combine, based on the determined large-scale change threshold and the heuristically determined small-scale change threshold, the large-scale change value and the small-scale change value for each pixel pair; and
determine, based on the determined composite change threshold, whether a change in the scene has occurred over the time period.

12. The change detection system of claim 11, wherein the first image and the second image generated by an image capture system coupled to the change detection system.

13. The change detection system of claim 12, wherein, to determine (i) the large-scale change threshold, (ii) the small-scale change threshold, and (iii) the composite change threshold, the processor is further configured to at least one of:
heuristically determine (i) the large-scale change threshold, (ii) the small-scale change threshold, and (iii) the composite change threshold; and
theoretically determine (i) the large-scale change threshold, (ii) the small-scale change threshold, and (iii) the composite change threshold.

14. The change detection system of claim 12, wherein the image capture system comprises a Synthetic Aperture Radar (SAR).

15. The change detection system of claim 12, wherein the image capture system comprises a Magnetic Resonance Imaging (MM) system.

16. The change detection system of claim 12, wherein, to determine (i) the large-scale change threshold, (ii) the small-scale change threshold, and (iii) the composite change threshold, the processor is further configured to at least one of:
empirically determine (i) the large-scale change threshold, (ii) the small-scale change threshold, and (iii) the composite change threshold; and
analytically determine (i) the large-scale change threshold, (ii) the small-scale change threshold, and (iii) the composite change threshold.

17. The change detection system of claim 11, wherein to heuristically determine the large-scale change threshold, the small-scale change threshold, and the composite change threshold, the processor is further configured to:
determine a relative likelihood for the large-scale change threshold and the small-scale change threshold by assigning pseudo-random positive values for at least one of: a number of samples present in each image, a true change value, a variation value of the first image, and a variation value of the second image.

18. The change detection system of claim 17, wherein to determine a relative likelihood for the large-scale change threshold and the small-scale change threshold by assigning pseudo-random positive values for at least one of: a number of samples present in each image, a true change value, a variation value of the first image, and a variation value of the second image, the processor is further configured to determine the relationship given by:

$$p(|\hat{\rho}_a|, \hat{R}) = \frac{(1-|\rho|^2)^N \Gamma(2N)}{\Gamma(N)\Gamma(N-1)}$$

-continued $$\frac{|\hat{\rho}_a|}{2(\hat{R}+1)^2}\left[\frac{1}{\hat{R}+1}\left(1-\frac{1}{\hat{R}+1}\right)-\frac{|\hat{\rho}_a|^2}{4}\right]^{N-2}\left[|\hat{\rho}_a||\rho|+\frac{\sigma_g^2\hat{R}+\sigma_f^2}{(\hat{R}+1)\sigma_f\sigma_g}\right]^{-2N}$$

$$F_{21}\left(\frac{1}{2},2N,1,\frac{2|\hat{\rho}_a||\rho|}{|\hat{\rho}_a||\rho|+\frac{\sigma_g^2\hat{R}+\sigma_f^2}{(\hat{R}+1)\sigma_f\sigma_g}}\right),$$

where $$|\hat{\rho}_a|\leq\left[\frac{4\hat{R}}{(\hat{R}+1)^2}\right]^{\frac{1}{2}},\ 0\leq\hat{R}<\infty$$

and wherein $p(|\hat{\rho}_a|,\hat{R})$ is a joint density function of the coherent change detector and the non-coherent intensity change detector, $|\hat{\rho}_a|$ is the large-scale change value based on a correlation coefficient of the first and second images, $\hat{R}$ is the small-scale change value based on a ratio of variances between corresponding pixels of the first and second images, N is a number of samples present in the first and second images, $\sigma_f$ is a standard deviation value of the first image, $\sigma_g$ is a standard deviation value of the second image, and $F_{21}$ is a generalized hypergeometric function.

19. The change detection system of claim 11, wherein a large-scale change corresponds to a large difference in pixel magnitude between the second image and the first image.

20. The change detection system of claim 11, wherein a small-scale change corresponds to a difference in phase between pixels of the second image and the first image.

21. The change detection system of claim 11, wherein the processor is further configured to:
in response to the composite change value for each pair of corresponding pixel locations reaching the composite change threshold, generate an indication that at least one change was detected between the first and second images; and
provide the first and second images for further processing.

22. A non-transitory machine-readable storage medium, having encoded thereon program code, wherein, when the program code is executed by a machine, the machine implements a method of detecting changes in a scene over a time period, the method comprising:
using an imaging system to obtain a first image of the scene at a first time and a second image of the scene at a second, different time;
using an image processor programmed with a non-coherent intensity change detector module to analyze and detect large-scale changes between the first image and the second image;
using the non-coherent intensity change detector module to calculate a large-scale change value for pairs of corresponding pixel locations in the first and second images;
in response to the large-scale change value for each pair of corresponding pixel locations reaching a selected large-scale change threshold, using an image processor programmed with a coherent change detector module to analyze and detect small-scale changes between the first image and the second image;
using the coherent change detector module to calculate a small-scale change value for selected ones of the pairs of corresponding pixel locations in the first and second images; and
using an image processor to calculate a composite change value by combining the large-scale change value and the small-scale change value for each pixel pair, wherein the combining comprises:
determining (i) the large-scale change threshold, (ii) a small-scale change threshold, and (iii) a composite change threshold;
combining, based on the determined large-scale change threshold and the heuristically determined small-scale change threshold, the large-scale change value and the small-scale change value for each pixel pair; and
determining, based on the determined composite change threshold, whether a change in the scene has occurred over the time period.

23. The non-transitory machine-readable storage medium of claim 22, wherein the imaging system comprises at least one of: a Synthetic Aperture Radar (SAR) and a Magnetic Resonance Imaging (MRI) system.

24. The non-transitory machine-readable storage medium of claim 22, wherein determining (i) the large-scale change threshold, (ii) the small-scale change threshold, and (iii) the composite change threshold comprises at least one of:
heuristically determining (i) the large-scale change threshold, (ii) the small-scale change threshold, and (iii) the composite change threshold; and
theoretically determining (i) the large-scale change threshold, (ii) the small-scale change threshold, and (iii) the composite change threshold.

25. The non-transitory machine-readable storage medium of claim 22, wherein determining the large-scale change threshold, the small-scale change threshold, and the composite change threshold comprises:
determining a relative likelihood for the large-scale change threshold and the small-scale change threshold by assigning pseudo-random positive values for at least one of: a number of samples present in each image, a true change value, a variation value of the first image, and a variation value of the second image.

26. The non-transitory machine-readable storage medium of claim 25, wherein determining a relative likelihood for the large-scale change threshold and the small-scale change threshold by assigning pseudo-random positive values for at least one of: a number of samples present in each image, a true change value, a variation value of the first image, and a variation value of the second image comprises determining the relationship given by:

$$p(|\hat{\rho}_a|,\hat{R})=\frac{(1-|\rho|^2)^N\Gamma(2N)}{\Gamma(N)\Gamma(N-1)}$$

$$\frac{|\hat{\rho}_a|}{2(\hat{R}+1)^2}\left[\frac{1}{\hat{R}+1}\left(1-\frac{1}{\hat{R}+1}\right)-\frac{|\hat{\rho}_a|^2}{4}\right]^{N-2}\left[|\hat{\rho}_a||\rho|+\frac{\sigma_g^2\hat{R}+\sigma_f^2}{(\hat{R}+1)\sigma_f\sigma_g}\right]^{-2N}$$

$$F_{21}\left(\frac{1}{2},2N,1,\frac{2|\hat{\rho}_a||\rho|}{|\hat{\rho}_a||\rho|+\frac{\sigma_g^2\hat{R}+\sigma_f^2}{(\hat{R}+1)\sigma_f\sigma_g}}\right),$$

where $$|\hat{\rho}_a|\leq\left[\frac{4\hat{R}}{(\hat{R}+1)^2}\right]^{\frac{1}{2}},\ 0\leq\hat{R}<\infty$$

and wherein $\hat{p}(|\hat{\rho}_a|, \hat{R})$ is a joint density function of the coherent change detector and the non-coherent intensity change detector, $|\hat{\rho}_a|$ is the large-scale change value based on a correlation coefficient of the first and second images, $\hat{R}$ is the small-scale change value based on a ratio of variances between corresponding pixels of the first and second images, N is a number of samples present in the first and second images, $\sigma_f$ is a standard deviation value of the first image, $\sigma_g$ is a standard deviation value of the second image, and $F_{21}$ is a generalized hypergeometric function.

27. The non-transitory machine-readable storage medium of claim 22, wherein a large-scale change corresponds to a large difference in pixel magnitude between the second image and the first image, and wherein a small-scale change corresponds to a difference in phase between pixels of the second image and the first image.

28. The non-transitory machine-readable storage medium of claim 22, further comprising:

in response to the composite change value for each pair of corresponding pixel locations reaching the composite change threshold, generating an indication that at least one change was detected between the first and second images; and providing the first and second images for further processing.

29. The non-transitory machine-readable storage medium of claim 22, further comprising:

using the imaging system to obtain a plurality of images of the scene, each image obtained at different times; and using the non-coherent intensity change detector and the coherent change detector to detect changes between one or more sets of the plurality of images of the scene.

30. The non-transitory machine-readable storage medium of claim 22, wherein determining (i) the large-scale change threshold, (ii) the small-scale change threshold, and (iii) the composite change threshold comprises at least one of:

empirically determining (i) the large-scale change threshold, (ii) the small-scale change threshold, and (iii) the composite change threshold; and analytically determining (i) the large-scale change threshold, (ii) the small-scale change threshold, and (iii) the composite change threshold.

\* \* \* \* \*